US009383445B2

(12) United States Patent
Lu et al.

(10) Patent No.: US 9,383,445 B2
(45) Date of Patent: Jul. 5, 2016

(54) OBJECT DETECTION SYSTEM

(71) Applicant: MAGNA ELECTRONICS INC., Auburn Hills, MI (US)

(72) Inventors: Yuesheng Lu, Farmington Hills, MI (US); Michael J. Higgins-Luthman, Livonia, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 383 days.

(21) Appl. No.: 14/319,164

(22) Filed: Jun. 30, 2014

(65) Prior Publication Data
US 2015/0332102 A1    Nov. 19, 2015

Related U.S. Application Data

(63) Continuation of application No. 13/242,991, filed on Sep. 23, 2011, now Pat. No. 8,767,186, which is a continuation of application No. 12/266,656, filed on Nov. 7, 2008, now Pat. No. 8,027,029.

(60) Provisional application No. 60/986,016, filed on Nov. 7, 2007.

(51) Int. Cl.
*G01S 17/02* (2006.01)
*G06K 9/32* (2006.01)
*H04N 5/217* (2011.01)
(Continued)

(52) U.S. Cl.
CPC .............. *G01S 17/023* (2013.01); *B60R 1/00* (2013.01); *G01S 7/4802* (2013.01); *G01S 7/4817* (2013.01); *G01S 7/4865* (2013.01); *G01S 17/58* (2013.01); *G01S 17/89* (2013.01); *G01S 17/936* (2013.01); *G06K 9/00805* (2013.01); *G06K 9/209* (2013.01); *G06K 9/3241* (2013.01); *G06T 5/50* (2013.01); *H04N 5/217* (2013.01); *H04N 5/33* (2013.01); *B60R 2300/8033* (2013.01); *B60R 2300/8093* (2013.01); *G01C 3/08* (2013.01); *G06K 2209/21* (2013.01); *G06T 2207/10016* (2013.01); *G06T 2207/10048* (2013.01);
(Continued)

(58) Field of Classification Search
CPC ........ G01C 3/08; G01S 17/023; G01S 17/936
USPC .................... 701/36, 301; 356/4.01
See application file for complete search history.

(56) References Cited

U.S. PATENT DOCUMENTS 5,249,157 A * 9/1993 Taylor ................ G01S 7/4811
                                                             340/435
5,296,909 A    3/1994 Fazi et al.
(Continued)

*Primary Examiner* — Luke Ratcliffe
(74) *Attorney, Agent, or Firm* — Gardner, Linn, Burkhart & Flory, LLP

(57) ABSTRACT

An object detection system for a host vehicle includes an imaging device operable to capture image data representative of a scene exterior the host vehicle. An image processor processes captured image data to detect an object. A ranging device tracks the detected object and determines distance to the detected object. The detected object is assigned a priority score that represents the potential danger of the detected object to the host vehicle. The priority score is at least in part established responsive to image processing by the image processor of captured image data and to distance determined by the ranging unit. The detected object is assigned its priority score based on one of (i) the detected object being a vehicle that is closing with the host vehicle and (ii) the detected object being a pedestrian who is present in the field of view of said imaging device.

17 Claims, 4 Drawing Sheets

(51) Int. Cl.

| | | |
|---|---|---|
| H04N 5/33 | (2006.01) | |
| G06T 5/50 | (2006.01) | |
| G01S 17/89 | (2006.01) | |
| G01S 7/486 | (2006.01) | |
| B60R 1/00 | (2006.01) | |
| G01S 7/48 | (2006.01) | |
| G01S 7/481 | (2006.01) | |
| G01S 17/58 | (2006.01) | |
| G01S 17/93 | (2006.01) | |
| G06K 9/20 | (2006.01) | |
| G06K 9/00 | (2006.01) | |
| G01C 3/08 | (2006.01) | |

(52) U.S. Cl.
CPC .......... G06T2207/30252 (2013.01); G06T 2207/30261 (2013.01)

(56) References Cited

U.S. PATENT DOCUMENTS

| | | | |
|---|---|---|---|
| 5,341,142 A | | 8/1994 | Reis et al. |
| 5,343,206 A | | 8/1994 | Ansaldi et al. |
| 5,378,888 A | * | 1/1995 | Stappaerts ............. G01S 17/66 250/201.9 |
| 5,408,541 A | * | 4/1995 | Sewell .................... G01S 7/486 348/144 |
| 5,550,677 A | | 8/1996 | Schofield et al. |
| 5,572,428 A | * | 11/1996 | Ishida ............... B60K 31/0008 180/169 |
| 5,594,414 A | * | 1/1997 | Namngani ............ B60Q 9/008 180/168 |
| 5,617,085 A | | 4/1997 | Tsutsumi et al. |
| 5,627,510 A | | 5/1997 | Yuan |
| 5,627,518 A | | 5/1997 | Wishart |
| 5,670,935 A | | 9/1997 | Schofield et al. |
| 5,734,736 A | * | 3/1998 | Palmer .................. B64G 1/646 244/172.4 |
| 5,745,050 A | | 4/1998 | Nakagawa |
| 5,784,023 A | * | 7/1998 | Bluege ................. G01S 7/4815 342/104 |
| 5,796,094 A | | 8/1998 | Schofield et al. |
| 5,877,897 A | | 3/1999 | Schofield et al. |
| 5,939,987 A | | 8/1999 | Cram |
| 5,949,366 A | * | 9/1999 | Herrmann .............. G01S 7/411 342/72 |
| 6,035,053 A | * | 3/2000 | Yoshioka ........... B60K 31/0008 340/435 |
| 6,085,151 A | * | 7/2000 | Farmer ................. G01S 7/023 342/70 |
| 6,097,023 A | | 8/2000 | Schofield et al. |
| 6,122,040 A | | 9/2000 | Arita et al. |
| 6,215,731 B1 | * | 4/2001 | Smith ..................... F41H 11/00 367/128 |
| 6,229,597 B1 | | 5/2001 | Kikuchi |
| 6,256,565 B1 | * | 7/2001 | Yanagi ................. B60R 21/015 180/232 |
| 6,281,806 B1 | | 8/2001 | Smith et al. |
| 6,313,454 B1 | | 11/2001 | Bos et al. |
| 6,320,176 B1 | | 11/2001 | Schofield et al. |
| 6,396,397 B1 | | 5/2002 | Bos et al. |
| 6,405,132 B1 | * | 6/2002 | Breed ..................... B60N 2/002 701/117 |
| 6,498,620 B2 | | 12/2002 | Schofield et al. |
| 6,559,435 B2 | | 5/2003 | Schofield et al. |
| 6,587,186 B2 | | 7/2003 | Bamji et al. |
| 6,657,705 B2 | | 12/2003 | Sano et al. |
| 6,674,895 B2 | | 1/2004 | Rafii et al. |
| 6,675,094 B2 | * | 1/2004 | Russell ................. G01S 13/931 701/301 |
| 6,678,039 B2 | | 1/2004 | Charbon |
| 6,690,354 B2 | | 2/2004 | Sze |
| 6,710,770 B2 | | 3/2004 | Tomasi et al. |
| 6,804,607 B1 | * | 10/2004 | Wood .................... G01S 3/784 180/167 |
| 6,806,452 B2 | | 10/2004 | Bos et al. |
| 6,819,407 B2 | | 11/2004 | Arita et al. |
| 6,825,455 B1 | | 11/2004 | Schwarte |
| 6,831,261 B2 | | 12/2004 | Schofield et al. |
| 6,860,350 B2 | | 3/2005 | Beuhler et al. |
| 6,876,775 B2 | | 4/2005 | Torunogiu |
| 6,906,793 B2 | | 6/2005 | Bamji et al. |
| 6,919,549 B2 | | 7/2005 | Bamji et al. |
| 6,946,978 B2 | | 9/2005 | Schofield |
| 6,956,227 B2 | | 10/2005 | Miyazaki et al. |
| 7,004,606 B2 | | 2/2006 | Schofield |
| 7,005,974 B2 | | 2/2006 | McMahon et al. |
| 7,014,003 B2 | | 3/2006 | Polak |
| 7,026,600 B2 | | 4/2006 | Jamieson et al. |
| 7,053,357 B2 | | 5/2006 | Schwarte |
| 7,123,168 B2 | | 10/2006 | Schofield |
| 7,124,027 B1 | * | 10/2006 | Ernst, Jr. ............... B60W 30/09 340/435 |
| 7,157,685 B2 | | 1/2007 | Bamji et al. |
| 7,176,438 B2 | | 2/2007 | Bamji et al. |
| 7,203,356 B2 | | 4/2007 | Gokturk et al. |
| 7,209,221 B2 | | 4/2007 | Breed et al. |
| 7,212,663 B2 | | 5/2007 | Tomasi |
| 7,250,853 B2 | | 7/2007 | Flynn |
| 7,283,213 B2 | | 10/2007 | O'Connor et al. |
| 7,310,431 B2 | | 12/2007 | Gokturk et al. |
| 7,321,111 B2 | | 1/2008 | Bamji et al. |
| 7,340,077 B2 | | 3/2008 | Gokturk et al. |
| 7,347,595 B2 | | 3/2008 | Brun et al. |
| 7,352,454 B2 | | 4/2008 | Bamji |
| 7,359,782 B2 | | 4/2008 | Breed |
| 7,375,803 B1 | | 5/2008 | Bamji |
| 7,379,100 B2 | | 5/2008 | Gokturk et al. |
| 7,379,163 B2 | | 5/2008 | Rafii et al. |
| 7,394,356 B2 | * | 7/2008 | Kumabe ................ B60Q 1/50 340/436 |
| 7,405,812 B1 | | 7/2008 | Bamji |
| 7,408,627 B2 | | 8/2008 | Bamji et al. |
| 7,409,295 B2 | * | 8/2008 | Paradie ............ G06K 9/00805 701/301 |
| 7,440,084 B2 | | 10/2008 | Kane |
| 7,544,945 B2 | | 6/2009 | Tan et al. |
| 7,617,048 B2 | * | 11/2009 | Simon .................. G01S 13/931 280/735 |
| 7,646,884 B2 | | 1/2010 | Remillard et al. |
| 7,702,425 B2 | | 4/2010 | Hougen |
| 7,782,184 B2 | | 8/2010 | Wittorf et al. |
| 7,914,187 B2 | | 3/2011 | Higgins-Luthman et al. |
| 8,027,029 B2 | | 9/2011 | Lu et al. |
| 8,082,101 B2 | * | 12/2011 | Stein ......................... G08G 1/16 382/104 |
| 8,125,622 B2 | | 2/2012 | Gammenthaler |
| 8,195,387 B2 | | 6/2012 | Moritz et al. |
| 8,400,511 B2 | | 3/2013 | Wood et al. |
| 8,610,881 B2 | | 12/2013 | Gammenthaler |
| 8,767,186 B2 | | 7/2014 | Lu et al. |
| 2002/0005778 A1 | * | 1/2002 | Breed .................... B60Q 9/008 340/435 |
| 2002/0134151 A1 | * | 9/2002 | Naruoka ................. G01S 11/12 73/291 |
| 2003/0090647 A1 | * | 5/2003 | Isogai ..................... G01C 3/22 356/4.01 |
| 2003/0191568 A1 | * | 10/2003 | Breed .................... B60W 40/06 701/36 |
| 2004/0150514 A1 | * | 8/2004 | Newman ............... B60Q 9/008 340/435 |
| 2004/0254729 A1 | | 12/2004 | Browne et al. |
| 2004/0258279 A1 | * | 12/2004 | Hirvonen ........... G06K 9/00201 382/104 |
| 2005/0084156 A1 | * | 4/2005 | Das ..................... G06K 9/3241 382/224 |
| 2005/0189503 A1 | | 9/2005 | Jamieson et al. |
| 2005/0195383 A1 | * | 9/2005 | Breed ..................... B60N 2/002 356/4.01 |
| 2005/0232463 A1 | * | 10/2005 | Hirvonen ........... G06K 9/00805 382/103 |
| 2005/0273212 A1 | | 12/2005 | Hougen |
| 2006/0041381 A1 | * | 2/2006 | Simon .................. G01S 13/931 701/301 |

(56) References Cited

U.S. PATENT DOCUMENTS

| | | |
|---|---|---|
| 2006/0132752 A1 | 6/2006 | Kane |
| 2006/0139162 A1 | 6/2006 | Flynn |
| 2006/0195231 A1* | 8/2006 | Diebold ............... B60R 21/013 701/1 |
| 2007/0146195 A1* | 6/2007 | Wallenberg ............ G01S 13/78 342/52 |
| 2007/0181810 A1 | 8/2007 | Tan et al. |
| 2007/0237398 A1* | 10/2007 | Chang ................ G06K 9/00369 382/224 |
| 2009/0237668 A1* | 9/2009 | Reyes, Jr. ........... G01N 21/3563 356/445 |
| 2009/0278709 A1* | 11/2009 | Endo .................... B62D 15/027 340/932.2 |
| 2012/0008129 A1 | 1/2012 | Lu et al. |
| 2012/0154788 A1 | 6/2012 | Gammenthaler |
| 2012/0257792 A1 | 10/2012 | Simon |
| 2013/0107051 A1 | 5/2013 | Maruoka et al. |

\* cited by examiner

OBJECT DETECTION SYSTEM

CROSS REFERENCE TO RELATED APPLICATIONS

The present application is a continuation of U.S. patent application Ser. No. 13/242,991, filed Sep. 23, 2011, now U.S. Pat. No. 8,767,186, which is a continuation of U.S. patent application Ser. No. 12/266,656, filed Nov. 7, 2008, now U.S. Pat. No. 8,027,029, which claims the benefit of U.S. provisional application Ser. No. 60/986,016, filed Nov. 7, 2007, which is hereby incorporated herein by reference in its entirety.

BACKGROUND OF THE INVENTION

It is known to detect objects or other vehicles with camera vision systems. Examples of such vision systems are described in U.S. Pat. Nos. 5,796,094; 6,097,023; 6,320,176; 6,313,454; 6,559,435; 6,831,261; 6,396,397; 5,877,897; 6,498,620; 5,670,935; 6,806,452; 6,946,978; 7,123,168; 7,004,606; 7,005,974 and/or 5,550,677, which are hereby incorporated herein by reference in their entireties.

SUMMARY OF THE INVENTION

The present invention provides a road object detection and tracking systems that is based on the fusion of camera vision and Lidar technologies. The system and concept can provide driver assistance and safety functions, such as adaptive cruise control, stop and go control, pedestrian detection, front and rear collision warning, lane departure warning, side object detection, rear object detection, side and/or rear and/or front blind zone detection, and/or the like.

For the above mentioned driver assistance and safety applications, it is important to detect and identify objects on the road, and is desirable to measure object distance and relative speed to the driver's own vehicle (the host or subject vehicle). The proposed technology has the advantages over others to fulfill these requirements.

DESCRIPTION OF THE PREFERRED EMBODIMENTS

Figure 1:
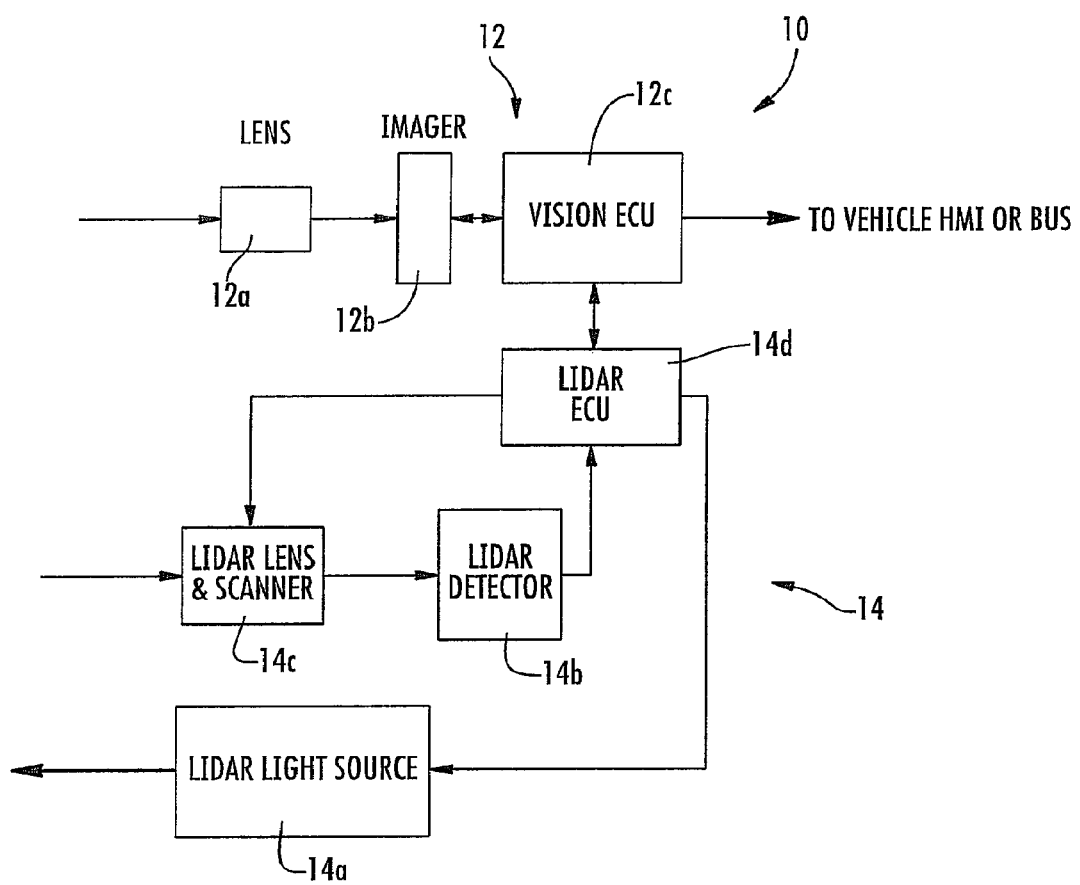
FIG. 1 is a block diagram of the Lidar and camera-based vision system of the present invention.

Referring now to the drawings and the illustrative embodiments depicted therein, a combined vision and Lidar system 10 of the present invention provides a combination of the core of Lidar and camera based vision modules (see FIG. 1). The camera vision module 12 is comprised of a lens 12a, an imager 12b, a vision ECU 12c and vision algorithm. The vision module detects and identifies objects in the field of view. The Lidar module or system 14 in general is comprised of a light source 14a, a light detector 14b, lenses for source and detector, a scanning device 14c, a modulation signal generator, a signal amplifier, and a signal processing unit 14d. Lidar system 14 measures object distance by comparing the modulation phase or calculating a time of flight of the light from the object (such as by utilizing processes such as those described in U.S. Pat. Nos. 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, which are hereby incorporated herein by reference in their entireties). Lateral and vertical resolution of a scene can be realized by mechanically scanning the light beam in a raster fashion, such as in a manner similar to known or conventional Lidar systems, such as those described in the patents incorporated by reference above. In the illustrated embodiment, and as shown in FIG. 1, the vision system camera 12b is used to provide lateral and vertical resolution of the scene. The mechanical scanner does not need to perform raster scanning; instead, the Lidar line of sight and/or source light is guided by the vision module to point to the objects of interest and measure the distances between the objects and the host or subject vehicle, as discussed below.

Figure 2A:
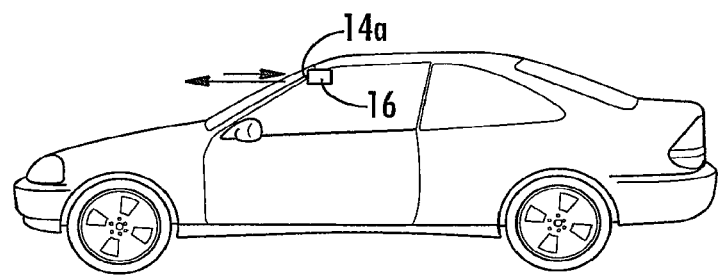
FIGS. 2A-C are side elevations of a vehicle having a Lidar and camera-based vision system incorporated therein in accordance with the present invention.
Figure 2B:
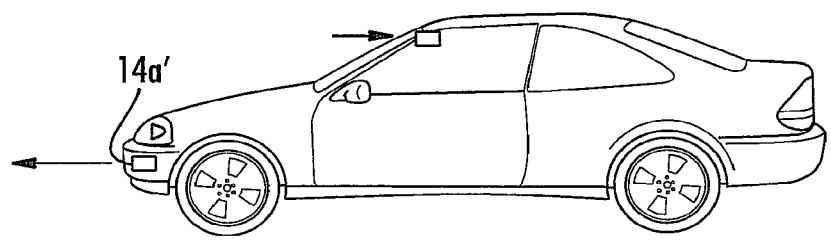
Figure 2C:
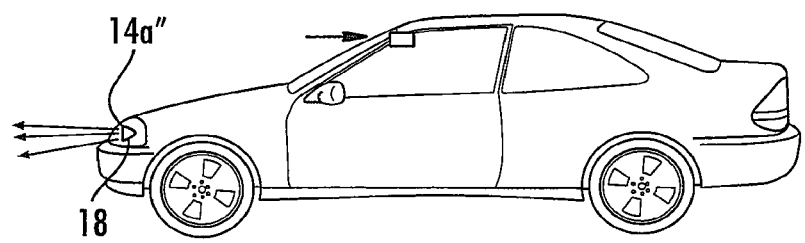

The Lidar light source can be any suitable light source, such as, for example, a laser operating in an infrared wavelength (or near infrared) and eye-safe, a LED or LED array operating in the infrared or near infrared region and eye-safe, and/or one or more vehicle headlamps. Optionally, for example, the laser or LEDs 14a can be mounted as a part of the camera-Lidar module that is mounted behind the rear view mirror 16 inside the vehicle compartment, such as shown in FIG. 2A. Optionally, the laser or LEDs 14a' can be mounted separately from camera-Lidar module, such as shown in FIG. 2B. Optionally, and as shown in FIG. 2C, the system may utilize the vehicle headlamp 18 as the Lidar light source 14a". In this case, high frequency pulse width modulation may be applied to the headlamp. Optionally, LEDs as the Lidar source can be built inside the headlamp assembly. Clearly, the Lidar source may comprise other light sources and/or may be disposed elsewhere at the vehicle while remaining within the spirit and scope of the present invention.

When using laser as the Lidar light source, the laser may be collinear to the detector line of sight and steered by the same steering mechanism. It can also be steered by a separate steering mechanism, which is synchronized with the detector line of sight steering. The boundary of the scanned light should match vision camera's field of view boundary. When using LEDs as the Lidar light source, the LED light should be collimated and then steered, or the LED(s) may be designed to spread the light to cover the whole field of view.

Figure 3A:
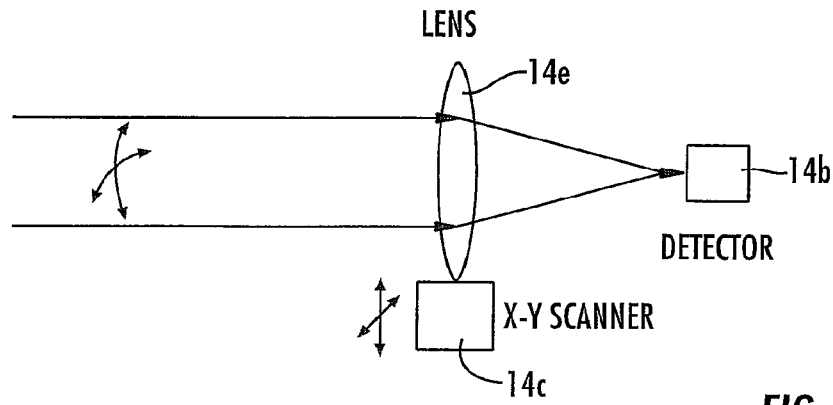
FIGS. 3A-D are schematics of different means for steering the Lidar light source and detector line of sight in accordance with the present invention.
Figure 3B:
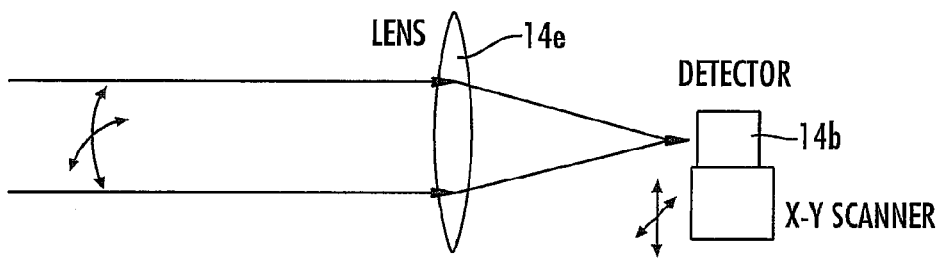
Figure 3C:
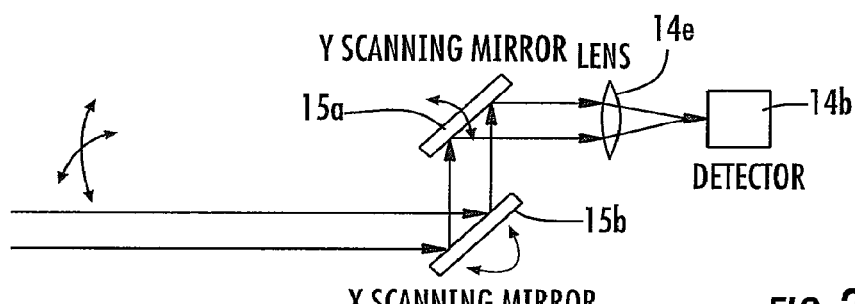
Figure 3D:
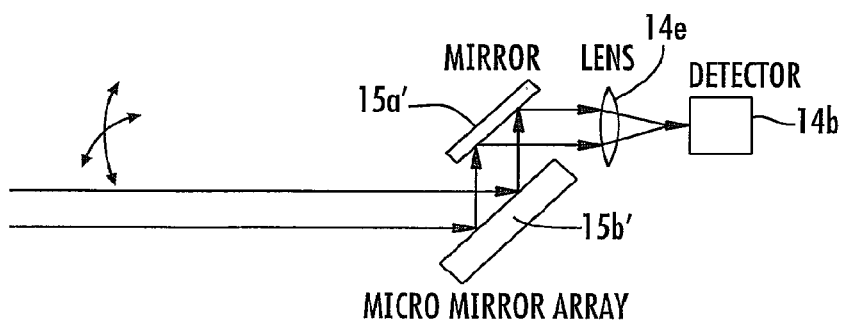

To provide a steering mechanism to the Lidar light source and detector line of sight, one can use any suitable steering means, such as, for example, via one of the following methods: (i) move the lens 14e in X and Y translational directions by mechanical means (FIG. 3A); (ii) move the detector 14b in X and Y translational directions by mechanical means (FIG. 3B); (iii) reflect light by two scanning mirrors 15a, 15b that rotate in orthogonal directions that equivalently provide X and Y movements (FIG. 3C); and/or (iv) reflect light by one or two micro mirror array (MEMS) devices 15a', 15b' that steer light in X and Y directions (FIG. 3D).

Optionally, the steering mechanisms described in FIGS. 3A and 3B can be realized by a "speaker coil" type actuator that moves the lens or detector, or a piezoelectric actuator that drives the lens or detector in translation motions, or a servo/step motor to drive the lens or detector in translation motions, or any other suitable means. Optionally, the steering mechanisms described in FIG. 3C can be realized by a "galvanometer" type scanning mirror, or a piezoelectric actuator to drive the lens or detector in rotation motions, or a servo/step motor to drive the lens or detector in rotation motions or other suitable means.

The basic sequence of the operation may include the following. The vision camera may acquire an image frame or frames at a certain rate (such as, for example, about 30 frames per second (fps) or thereabouts). The vision processing algorithm processes image(s) and identifies object(s) of interest in the field of view of the imager or camera. A signal or data indicative of the X and Y coordinates of the objects is communicated to a Lidar steering unit. The Lidar unit is steered to direct the light toward a first object based on the given coordinates and the unit may measure the distance to the first object, and the Lidar unit may be steered to direct the light toward a second object or objects and may measure distance to the next object or objects, and so on, until all objects and distances are measured. The system may calculate speed data for all objects if necessary or desired, and may feed the distance and speed data back to an object identification algorithm to improve object identification and prioritization. These steps may be repeated during operation of the system.

The system provides 3 dimensional and 1 timing information of a road object(s) relative to the vehicle that hosts the system. The information provided may include the X and Y coordinates of an object in the camera's field of view, the distance (Z) between the object(s) and the host vehicle, and the time of possible collision based on the speed of the object and the host vehicle.

The vision module acquires, processes and identifies objects that are of interest to the applications, such as vehicles, pedestrians, roadside buildings, traffic lights, traffic signs, tail lights and head lights, and/or the like. The vision system may also identify lane markers, curbs and/or road dividers to help to determine the lane that the host vehicle is in and where the other vehicles or objects are relative to that lane. Identifying if another vehicle is in the host vehicle's lane is useful for adaptive cruise control systems (ACC) and/or stop and go applications and/or collision warning applications. Algorithms that have already been developed in Lane Departure Warning systems can serve that purpose.

Lidar measures the distance from an object to the host vehicle. By adding this distance information to the 2-dimensional object position information, the algorithm can construct full 3-dimensional position information of an object or objects. The timing information given by the video frames, along with the host vehicle speed information (read from vehicle bus), enable the calculation of the object speeds. The distance and speed information can also feedback to the vision algorithm to help its object identification. Besides the X and Y coordinates of the objects that the camera vision module gives, the distance and speed information add two more dimensions to identify objects. In addition, lane mark information adds critical information for applications like ACC and collision warning. Based on the objects' 4-dimensional information and lane mark information, a map of road objects can be generated.

Priority scores can be assigned to all objects in the image. The priority scores represent the danger or importance of the objects detected in a scene. The objects with high priority scores have one, a few or all of the following characteristics:
  vehicles that are close to the host vehicle;
  vehicles that are closing to the host vehicle in relative speed and collision will happen in pre-determined time;
  vehicles that are in the same lane of the host vehicle;
  vehicles that are moving to the same lane of the host vehicle (a vehicle cut in the lane at a close distance in front of the host vehicle); and/or
  a pedestrian moving toward the center of the view.

Figure 4A:
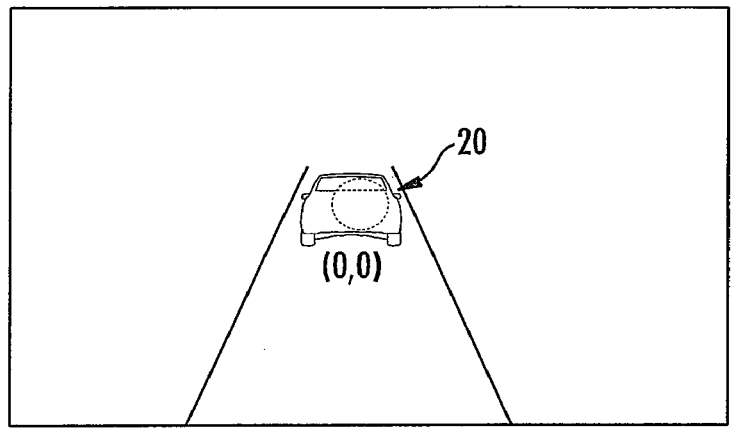
FIGS. 4A and 4B are images of the field of view of the imaging sensor or camera of the Lidar and camera based system of the present invention.
Figure 4B:
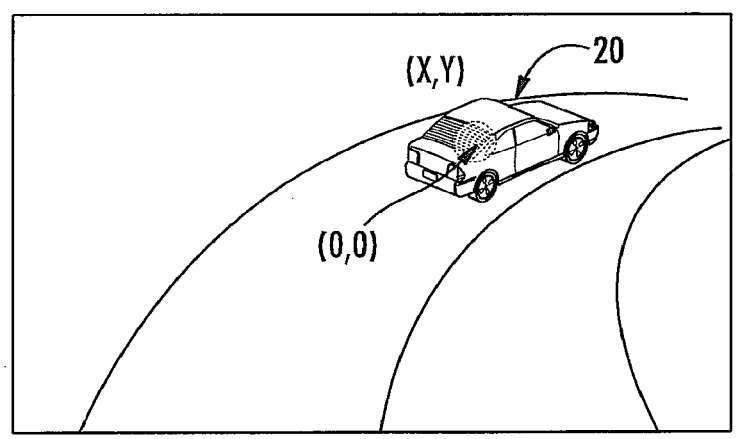

In traditional Lidar systems that provide and process a full field of view, the beam is scanned in raster fashion, or multiple detectors are scanned in sequence, in which case an equal amount of time is allocated to all of the objects in the field of view. However, the system in accordance with the present invention can assign different amounts of "staring" time to the different objects. A longer time may be assigned to the objects with higher priority scores. The coordinates of an object identified by the imager sensor guides the steering mechanism of the Lidar. The Lidar sight can track and stay on an object while the object moves in the camera's field of view. As can be seen with reference to FIGS. 4A and 4B, the coordinates (X,Y) may be given by the image sensor to an identified vehicle 20 in the field of view. The Lidar sight, which is represented by the circle in FIGS. 4A and 4B, is guided to point to the vehicle.

By staring for a longer time at one object or a limited number of objects in the field of view and avoiding time consuming mechanical steering across the scene, the Lidar can provide faster distance reading of one object or a limited number of objects in the field of view. The system provides the vehicle control module or modules with faster distance inputs, and thus allows quicker reaction time or speed and enhanced control to enhance avoidance of a collision with objects such as a pedestrian or another vehicle. For example, in an ACC application, the vehicle in front of the host vehicle and in the same lane has the highest priority score and will be stared by the Lidar for the most amount time and the system will update the distance data to the vehicle controllers more frequently, in order to maintain the safe distance and avoid a collision with the other vehicle. In pedestrian detection application, a pedestrian's distance and relative speed should be monitored to determine if his/her trajectory potentially runs into the host vehicle. The pedestrians who have more probability of running into the host vehicle are assigned higher priority scores and then they get a greater amount of the Lidar time and more frequent distance updates. In collision warning applications, the highest priority score may be assigned to a vehicle in the driver's or host vehicle's lane that is approaching to a position and speed that will collide with the driver's own vehicle within a pre-defined time. The system stares at the vehicle for most of the time and updates the distance information to the vehicle controller more frequently to allow the vehicle controllers to take quicker reaction. In stop-and-go applications, the system may track the nearest vehicle in front of the subject or host or equipped vehicle and in the same lane, and may identify, track and react to cut-in vehicle from next lanes. Those nearest vehicles or cut-in vehicles are assigned with most of the staring time and updates of distance measurement at the highest frequency in order to provide the vehicle controller a quicker reaction time or speed.

While the Lidar sight tracks high priority score objects for more time, it is also important to monitor low score objects at a reasonable frequency. Some objects may grow to higher priority ones and some objects may change to reduced priority scores. Continuous and real time monitoring and score assessment is desirable during operation of the system of the present invention.

Unlike the raster scanning mechanism in known Lidar systems (which have to scan a full raster field of view for each frame), the Lidar system of the present invention has advantages of faster steering and object tracking capability that are unique compared to competing technologies. By nature, the objects being tracked move slow in the horizontal and vertical directions in the camera and Lidar field of view. So the mechanical scanning takes much less time to track objects or hop or switch between the objects. In addition, the system does not have to waste scanning time in most of the "empty" space or spaces in the field of view that have no objects of interest. In other words, the system of the present invention can provide faster scene sampling rate or tracking speed than the regular raster scan Lidar system and multiple detector system. On the other hand, for the same or similar tracking speed, the present invention may require a relatively slower mechanical scanning speed, which may lead to a lower cost and higher durability of the scanning mechanics. Another advantage of the present invention is that the system of the present invention may provide a more efficient and accurate distance measurement, because it can stay at or process an object of interest for a longer time than the raster scanning Lidar does on the objects. Traditional raster scanning Lidar evenly spreads the beam in the full field of view and therefore has a shorter exposure time for each and every object in the field of view. Without wasting time on raster scanning, the system of the present invention can provide higher distance sampling rate than regular Lidar and Radar.

The system of the present invention may provide more accurate distance measurement because the Lidar beam can stay on an object for longer time. The system allows more pulses to be collected and special algorithms or techniques to be applied to enhance the detection sensitivity and confidence level. For example, the system may use a gated accumulation and average (Boxcar technique) of many pulses of light to increase the signal to noise ratio. Also, the system of the present invention may provide more accurate distance measurement because the object detection in the two dimensional image helps steer the Lidar beam in a more accurate angle. In addition, the distance reading of an object increases the confidence level of the two dimensional vision object detection, which in turn provides feedback to the Lidar and provides a more accurate distance measurement.

Another benefit of being able to "stare" longer on the object is that it provides enhanced performance in adverse weather conditions, such as rain or fog. One known disadvantage of known Lidar systems is the difficulty the system has in seeing long distances through rain or fog. The light is scattered or diffused by the water droplets in the rain and fog and causes the return light signal to be too weak to detect. However, by staying longer on objects, the system of the present invention can gather more light pulses and apply special methods and algorithms to enhance the detection sensitivity and confidence level. For example, one can use gated accumulation and average (Boxcar technique) of many pulses of light to increase signal to noise ratio.

The beam or line of sight steering needs to provide the field of view that is needed for matching the camera field of view and application needs. A focused Lidar source light and detection spot can deliver better resolution and higher sensitivity over known systems.

Camera vision provides high lateral and vertical resolution and the mature imaging processing technology allows sufficient or enhanced object identification, lane mark detection, and/or the like in high speed by utilizing mature color CMOS or CCD imagers. Lidar, on the other hand, provides excellent longitudinal resolution. Both are mature technologies with relative lower costs as compared with other competing technologies, such as Radar or the like. By combining these two technologies together, the present invention provides advantages in performance (such as high resolution in lateral, vertical and longitudinal dimensions; high detection and tracking speed; and reliable object identification and tracking), costs (such as due to the ability to combine circuits to share components; combine processor and memory; and lower speed mechanical scanning mechanics), size (smaller package size; main Lidar components can be integrated with the camera; and the system may be placed behind rear view mirror) and integration with existing vision-based systems, such as LDW, IHC, AFS, TSR and/or night vision systems and/or the like.

Applications of such a vision-Lidar fusion system include (i) adaptive cruise control (ACC), (ii) Stop and Go; (iii) pedestrian detection; (iv) collision warning at both front and rear sides of the vehicle; (v) predictive brake assist; (vi) side object detection, (vii) side blind zone object detection; (viii) rear blind zone object detection; (ix) parking assist; and/or (x) lane change aid detection (a side object detection system may include both blind zone and lane change aid functions) and/or the like.

Therefore, the present invention provides enhanced processing techniques over prior art technology, including scanning Lidar (which scans the whole field of view and has a slower tracking speed and is not as good at identifying objects in a complex scene and is not as good at detection in fog or rain); Radar (which is expensive and has a low horizontal resolution (only a few lobes) and is not as good at identifying objects in a complex scene); stereo vision (which requires two cameras and needs a wide baseline and rigid body, requires complex stereo image processing and has its distance accuracy limited by the camera separation); 2-D vision (which requires complex image processing and is not as accurate in measuring distances and does not provide reliable distance information for variable sizes of detected vehicles); range imager (an imager technology that can measure object distance by time of flight of the light pulses emitted by the light emitter, in addition to regular 2D image, and with the distance sensing being at the imager chip level, which is a complex semiconductor sensor fabrication and is a higher cost system).

Optionally, the imaging sensor of the present invention may comprise a two-dimensional pixelated imaging array having a plurality of photo-sensing pixels arranged or disposed or established on a semiconductor substrate. For example, the imaging sensor may comprise a complementary-metal-oxide-semiconductor (CMOS) or a CCD imaging sensor or device or the like, and may utilize aspects of the imaging sensors described in U.S. Pat. Nos. 5,796,094; 6,097,023; 6,320,176; 6,313,454; 6,559,435; 6,831,261; 6,396,397; 5,877,897; 6,498,620; 5,670,935; 5,760,962; 6,806,452; 6,946,978; 7,339,149; 7,123,168; 7,004,606; 7,005,974 and/or 5,550,677, and/or PCT Application No. PCT/US07/75702, filed Aug. 10, 2007 and published as International Publication No. WO 2008/024639, and/or U.S. patent applications, Ser. No. 11/239,980, filed Sep. 30, 2005, now U.S. Pat. No. 7,881,496; Ser. No. 11/105,757, filed Apr. 14, 2005, now U.S. Pat. No. 7,526,103; and/or Ser. No. 10/534,632, filed May 11, 2005, now U.S. Pat. No. 7,965,336, and/or International Publication Nos. WO 2004/047421 and/or PCT WO 07/053404, which are hereby incorporated herein by reference in their entireties.

Optionally, the system may include any imaging sensor or sensors, and may utilize aspects of various vision or imaging or detection systems, such as, for example, blind spot detection systems described in U.S. Pat. Nos. 7,038,577; 6,882,287; 6,198,409; 5,929,786 and/or 5,786,772, and/or U.S. patent applications, Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S.

provisional applications, Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or road surface detection systems, such as of the types described in U.S. patent application Ser. No. 11/948,086, filed Nov. 30, 2007 and published as U.S. Publication No. US 2008-0129541, and U.S. provisional application Ser. No. 60/872,270, filed Dec. 1, 2006, and/or reverse or backup aid systems, such as rearwardly directed vehicle vision systems of the types described in U.S. Pat. Nos. 7,005,974; 5,550,677; 5,760,962; 5,670,935; 6,201,642; 6,396,397; 6,498,620; 6,717,610 and/or 6,757,109, and/or of automatic headlamp control systems of the types described in U.S. Pat. Nos. 5,796,094 and/or 5,715,093, and/or U.S. patent application Ser. No. 11/105,757, filed Apr. 14, 2005, now U.S. Pat. No. 7,526,103, and/or U.S. provisional application Ser. No. 60/607,963, filed Sep. 8, 2004, and/or rain sensors or rain sensing systems of the types described in U.S. Pat. Nos. 6,250,148 and 6,341,523, and/or of other imaging or detecting systems, such as the types described in U.S. Pat. Nos. 6,353,392 and 6,313,454, and/or U.S. patent applications, Ser. No. 11/948,086, filed Nov. 30, 2007 and published as U.S. Publication No. US 2008-0129541; Ser. No. 12/171,436, filed Jul. 11, 2008, now U.S. Pat. No. 7,914,187, and/or Ser. No. 12/190,698, filed Aug. 13, 2008, now U.S. Pat. No. 8,017,898, and/or U.S. provisional applications, Ser. No. 60/872,270, filed Dec. 1, 2006; Ser. No. 60/949,352, filed Jul. 12, 2007; Ser. No. 60/956,633, filed Aug. 17, 2007, and/or PCT Application No. PCT/US07/75702, filed Aug. 10, 2007 and published as International Publication No. WO 2008/024639, and/or PCT Application No. PCT/US08/78700, filed Oct. 3, 2008 and published as International Publication No. WO 2009/046268, and/or PCT Application No. PCT/US08/76022, filed Sep. 11, 2008 and published as International Publication No. WO 2009/036176, with all of the above referenced U.S. patents, patent applications and provisional applications and PCT applications being commonly assigned and being hereby incorporated herein by reference in their entireties.

Optionally, the imaging sensor may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging and/or indicating systems described in U.S. Pat. Nos. 7,038,577; 6,882,287; 6,198,409; 5,929,786 and/or 5,786,772, and/or U.S. patent applications, Ser. No. 11/315,675, filed Dec. 22, 2005, now U.S. Pat. No. 7,720,580; Ser. No. 11/239,980, filed Sep. 30, 2005, now U.S. Pat. No. 7,881,496 and/or Ser. No. 11/933,697, filed Nov. 1, 2007, now U.S. Pat. No. 7,777,611, and/or International Publication Nos. WO 2007/005942 and/or WO 2008/051910, and/or U.S. provisional applications, Ser. No. 60/618,686, filed Oct. 14, 2004; Ser. No. 60/853,850, filed Oct. 24, 2006; Ser. No. 60/918,089, filed Mar. 15, 2007; Ser. No. 60/970,687, filed Sep. 7, 2007; and/or Ser. No. 60/857,025, filed Nov. 6, 2006, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 6,757,109 and/or 7,005,974, and/or of the rain sensors described in U.S. Pat. Nos. 6,250,148 and 6,341,523, and/or of other imaging systems, such as the types described in U.S. Pat. Nos. 7,123,168; 6,353,392 and 6,313,454, with all of the above referenced U.S. patents, patent applications and provisional applications and PCT applications being commonly assigned and being hereby incorporated herein by reference in their entireties.

Typically, customer specifications may require blind spot sensors, such as blind spot radar sensors and the like, to detect when they are blind due to the buildup of dirt, ice or snow in front of the sensor. This is also true for side object detections sensors which include side blind spot and lane change aid sensors. In practice, for many of these sensors, meeting those requirements can present a challenge, since the buildup cannot be actively detected, but rather has to be inferred from the lack of radar returns over a longer time. That works adequately in driving environments that have a lot of natural returns or objects for the system to detect as the vehicle travels along the road (such as guardrails and/or other vehicles and/or the like), but on some roads (such as some elevated roads where a sensor may not detect any object to the side of the host vehicle for minutes), such a system may fail. If the host vehicle is driven along such roads (such as some elevated roads in Sweden where a blind spot detecting sensor may not see anything for minutes), the absence of such a detection may trigger the blockage detection sensor. It is thus envisioned that such a blind spot detection system be combined with an input from a forward facing camera of the vehicle (such as a camera that is part of a headlamp control system or lane departure warning system or object detection system or the like of the vehicle). Thus, a blockage detection at the BSD sensor may be determined by the lack of detection of an object after that object is detected by the forward facing camera. For example, if the front sensor or camera detects that the host vehicle is passing another vehicle or structure, but the blind spot detecting sensor does not detect the object a short period of time later (depending on the speed of the vehicle), the system can determine that the blind spot detecting sensor has a blockage, whereby the system can detect such blockages much quicker than previously possible.

Changes and modifications to the specifically described embodiments may be carried out without departing from the principles of the present invention, which is intended to be limited only by the scope of the appended claims, as interpreted according to the principles of patent law.

The invention claimed is:

1. An object detection system for a host vehicle, said object detection system comprising:

an imaging device having a field of view exterior of the host vehicle and operable to capture image data representative of a scene exterior the host vehicle;

said imaging device comprising a two-dimensional pixelated imaging array having a plurality of photo-sensing pixels arranged on a semiconductor substrate;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on one of (i) the detected object being a vehicle that is closing with the host vehicle and (ii) the detected object being a pedestrian who is present in the field of view of said imaging device; and wherein a beam emitted by said ranging device at least one of (a) tracks the detected object while the detected object moves in the field of view of said imaging device and (b) stays on the detected object while the detected object moves in the field of view of said imaging device.

2. The object detection system of claim 1, wherein, responsive at least in part to image processing of captured image data by said image processor, a light beam emitted by a light source of the host vehicle impinges the detected object.

3. The object detection system of claim 2, wherein said ranging device comprises a Lidar module, said Lidar module comprising said light source, a detector and a scanner.

4. The object detection system of claim 1, wherein said ranging device is operable to determine distance to the detected object via a time of flight calculation.

5. The object detection system of claim 1, wherein said image processor processes captured image data to detect multiple objects in the field of view of said imaging device and wherein said system prioritizes detected objects based on at least one of (i) proximity of a detected object to the host vehicle, (ii) speed of a detected object relative to the host vehicle and (iii) location of a detected object relative to the host vehicle.

6. An object detection system for a host vehicle, said object detection system comprising:

an imaging device having a field of view exterior of the host vehicle and operable to capture image data representative of a scene exterior the host vehicle;

said imaging device comprising a two-dimensional pixelated imaging array having a plurality of photo-sensing pixels arranged on a semiconductor substrate;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on one of (i) the detected object being a vehicle that is closing with the host vehicle and (ii) the detected object being a pedestrian who is present in the field of view of said imaging device;

wherein said image processor processes captured image data to detect multiple objects in the field of view of said imaging device and wherein said system prioritizes detected objects based on at least one of (i) proximity of a detected object to the host vehicle, (ii) speed of a detected object relative to the host vehicle and (iii) location of a detected object relative to the host vehicle; and wherein said system guides a steerable beam of said ranging device towards a detected object in accordance with prioritization of the detected objects.

7. An object detection system for a host vehicle, said object detection system comprising:

an imaging device having a field of view exterior of the host vehicle and operable to capture image data representative of a scene exterior the host vehicle;

said imaging device comprising a two-dimensional pixelated imaging array having a plurality of photo-sensing pixels arranged on a semiconductor substrate;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on one of (i) the detected object being a vehicle that is closing with the host vehicle and (ii) the detected object being a pedestrian who is present in the field of view of said imaging device;

wherein said image processor processes captured image data to detect multiple objects in the field of view of said imaging device and wherein said system prioritizes detected objects based on at least one of (i) proximity of a detected object to the host vehicle, (ii) speed of a detected object relative to the host vehicle and (iii) location of a detected object relative to the host vehicle; and wherein said system guides a steerable beam of said ranging device toward a first detected object for a first period of time and said system guides a steerable beam of said ranging device toward a second detected object for a second period of time.

8. The object detection system of claim 7, wherein the first detected object has a higher priority than the second detected object and said first period of time is greater than said second period of time.

9. The object detection system of claim 7, wherein said imaging device comprises part of at least one of (a) an adaptive cruise control system of the host vehicle, (b) a collision warning system of the host vehicle and (c) a pedestrian detection system of the host vehicle.

10. An object detection system for a host vehicle, said object detection system comprising:

an imaging device having a field of view exterior of the host vehicle and operable to capture image data representative of a scene exterior the host vehicle;

said imaging device comprising a two-dimensional pixelated imaging array having a plurality of photo-sensing pixels arranged on a semiconductor substrate;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on one of (i) the detected object being a vehicle that is closing with the host vehicle and (ii) the detected object being a pedestrian who is present in the field of view of said imaging device; and wherein the priority score assigned to the detected object determines the dwell time at the detected object of a beam emitted by said ranging device.

11. The object detection system of claim 10, wherein said ranging device comprises a Lidar device.

12. An object detection system for a host vehicle, said object detection system comprising:

an imaging device having a field of view exterior of the host vehicle and operable to capture image data representative of a scene exterior the host vehicle;

said imaging device comprising a two-dimensional pixelated imaging array having a plurality of photo-sensing pixels arranged on a semiconductor substrate;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on one of (i) the detected object being a vehicle that is closing with the host vehicle and (ii) the detected object being a pedestrian who is present in the field of view of said imaging device; and wherein a beam emitted by said ranging device is mechanically steerable responsive to image processing of captured image data by said image processor.

13. The object detection system of claim 12, wherein the priority score is representative of the importance of the detected object in the field of view.

14. An object detection system for a host vehicle, said object detection system comprising:

an imaging device having a field of view exterior of the host vehicle and operable to capture image data representative of a scene exterior the host vehicle;

said imaging device comprising a CMOS two-dimensional pixelated imaging array having a plurality of photo-sensing pixels;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on the detected object being a pedestrian who is present in the field of view of said imaging device; and wherein a beam emitted by said ranging device at least one of (a) tracks the detected object while the detected object moves in the field of view of said imaging device and (b) stays on the detected object while the detected object moves in the field of view of said imaging device.

15. An object detection system for a host vehicle, said object detection system comprising:

an imaging device having a field of view exterior of the host vehicle and operable to capture image data representative of a scene exterior the host vehicle;

said imaging device comprising a CMOS two-dimensional pixelated imaging array having a plurality of photo-sensing pixels;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on the detected object being a pedestrian who is present in the field of view of said imaging device; and wherein, responsive at least in part to image processing of captured image data by said image processor, a light beam emitted by a light source of the host vehicle impinges the detected object.

16. An object detection system for a host vehicle, said object detection system comprising:

an imaging device having a field of view exterior of the host vehicle and operable to capture image data representative of a scene exterior the host vehicle;

said imaging device comprising a CMOS two-dimensional pixelated imaging array having a plurality of photo-sensing pixels;

an image processor processing captured image data to detect an object present in the field of view of said imaging device;

a ranging device;

said ranging device tracking the detected object;

said ranging device determining distance to the detected object;

wherein the detected object is assigned a priority score that represents the potential danger of the detected object to the host vehicle;

wherein the priority score is at least in part established responsive to image processing by said image processor of captured image data and to distance determined by said ranging unit;

wherein the detected object is assigned its priority score based on the detected object being a vehicle that is closing with the host vehicle; and wherein a beam emitted by said ranging device at least one of (a) tracks the detected object while the detected object moves in the field of view of said imaging device and (b) stays on the detected object while the detected object moves in the field of view of said imaging device.

17. The object detection system of claim 16, wherein, responsive at least in part to image processing of captured image data by said image processor, a light beam emitted by a light source of the host vehicle impinges the detected object.

* * * * *